United States Patent
Fan et al.

(10) Patent No.: US 10,152,291 B2
(45) Date of Patent: Dec. 11, 2018

(54) MULTI-PROJECTOR DISPLAY BOX FOR USE IN RETAIL MARKETING

(71) Applicant: OmniVision Technologies, Inc., Santa Clara, CA (US)

(72) Inventors: Chun-Sheng Fan, Zhudong Township (TW); Wei-Feng Lin, Hsinchu (TW)

(73) Assignee: OmniVision Technologies, Inc., Santa Clara, CA (US)

( * ) Notice: Subject to any disclaimer, the term of this patent is extended or adjusted under 35 U.S.C. 154(b) by 270 days.

(21) Appl. No.: 14/885,305

(22) Filed: Oct. 16, 2015

(65) Prior Publication Data

US 2017/0109115 A1    Apr. 20, 2017

(51) Int. Cl.
*G06F 3/14*    (2006.01)
*G03B 21/20*    (2006.01)
(Continued)

(52) U.S. Cl.
CPC ......... *G06F 3/1431* (2013.01); *G03B 21/208* (2013.01); *G03B 21/2013* (2013.01);
(Continued)

(58) Field of Classification Search
CPC .... G06F 3/1431; G06F 1/1639; G06F 1/1647; G03B 21/2066; G03B 21/2013; G03B 21/208; G03B 21/2073; G03B 21/2033; G03B 21/10; G03B 21/145; G03B 21/147; G09G 5/14; G09G 2360/04; G09G 2370/022; G09G 2380/04; G09G 3/204; G09G 3/208; G06Q 1/087
See application file for complete search history.

(56) References Cited

U.S. PATENT DOCUMENTS 5,715,622 A * 2/1998 Giordano, Jr. .......... G09F 3/204
40/448
6,249,263 B1 * 6/2001 Kayser .................... G06F 3/147
345/1.1
(Continued)

FOREIGN PATENT DOCUMENTS

WO    WO 0011518 A1 *    3/2000    ............. G03B 21/56

OTHER PUBLICATIONS

Electronic Shelf Labels; Imagotag; Retrieved from http://www.imagotag.com/solution/electronic-shelf-labels on Dec. 30, 2015. Note: This webpage might have been available online prior to Oct. 16, 2015.

(Continued)

*Primary Examiner* — Larry Lee
(74) *Attorney, Agent, or Firm* — Larry E. Henneman, Jr.; Gregory P. Gibson; Henneman & Associates, PLC

(57) ABSTRACT

A novel multi-display projection box includes a housing that is short and wide, a set of display panels, a set of projectors, and a controller. In a particular embodiment the set of display panels includes two display panels, each coupled to opposite sides of the housing. The set of projectors includes two projectors placed adjacent opposite side walls of the housing. One of the projectors projects a first image onto one of the display panels and the other projector projects a second image onto the other display panel. The first and second image can include product information corresponding to goods placed atop the projection box in a retail store.

24 Claims, 13 Drawing Sheets

(51) Int. Cl.
*G06Q 10/08* (2012.01)
*G09G 5/14* (2006.01)
*G06F 1/16* (2006.01)

(52) U.S. Cl.
CPC ..... *G03B 21/2033* (2013.01); *G03B 21/2066* (2013.01); *G03B 21/2073* (2013.01); *G06F 1/1639* (2013.01); *G06F 1/1647* (2013.01); *G06Q 10/087* (2013.01); *G09G 5/14* (2013.01); *G09G 2360/04* (2013.01); *G09G 2370/022* (2013.01); *G09G 2380/04* (2013.01)

(56) References Cited

U.S. PATENT DOCUMENTS

| | | | | |
|---|---|---|---|---|
| 7,832,874 | B2* | 11/2010 | Ikeda | A47F 3/001 353/74 |
| 2007/0229767 | A1* | 10/2007 | Ikeda | A47F 5/0018 353/28 |
| 2008/0055087 | A1* | 3/2008 | Horii | G03B 21/13 340/572.1 |
| 2011/0205500 | A1* | 8/2011 | Ikeda | A47F 5/0018 353/78 |
| 2012/0119977 | A1* | 5/2012 | Asami | G06F 3/1446 345/1.3 |
| 2012/0212711 | A1* | 8/2012 | Goto | G02B 27/0983 353/102 |
| 2013/0176398 | A1* | 7/2013 | Bonner | G09F 19/18 348/46 |
| 2016/0062130 | A1* | 3/2016 | Huang | G02B 27/26 353/8 |
| 2016/0238920 | A1* | 8/2016 | Lin | G03B 21/10 |
| 2016/0328767 | A1* | 11/2016 | Bonner | G06Q 30/0625 |

OTHER PUBLICATIONS

Electronic Shelf Labels; Imagotag; Retrieved from http://web.archive.org/web/20150723115411/http://www.imagotag.com/technology/electronic-shelf-labeling)on Aug. 20, 2016. Note: The archived webpage (http://www.imagotag.com/technology/electronic-shelf-labeling) might have been available online prior to Oct. 16, 2015.

Electronic Shelf Labeling; PT. Integrasi Cipta Elektrosolusi; Retrieved from https://www.iceindo.wordpress.com/about/electronic-shelf-labeling/ on Dec. 30, 2015. Note: This webpage might have been available online prior to Oct. 16, 2015.

* cited by examiner

MULTI-PROJECTOR DISPLAY BOX FOR USE IN RETAIL MARKETING

BACKGROUND

Technical Field

This invention relates generally to information displays, and more particularly to rear projection information displays. Even more particularly, this invention relates to rear projection displays for use in retail marketing.

Background

Retailers require a means of communicating the prices of items for sale to their customers. Currently, some retailers use paper price tagging, which involves "tagging" each item with a hang-tag, sticker, etc. with the price. This method is expensive, because it requires workers, who must be paid, to place/replace the tags. It also requires special equipment (e.g., labeling guns, etc.). This method is also error-prone, because workers might inadvertently place the wrong price on items. In addition, applying price tags increases the time required to stock shelves of the store.

The use of universal price codes (UPCs), which are usually present on the manufacture's label, can be scanned by a cashier to input correct pricing into a register. However, the UPCs don't provide pricing information to the purchaser and so are typically used in conjunction with price labels mounted on a shelf upon which the items are displayed. The use of shelf tags can be problematic, because items might be placed on the wrong shelf with a shelf tag corresponding to a different product, different size, etc. Confusion over the price can lead to customers unwittingly paying more for the product than they intended. Even if the discrepancy is recognized at the register, the confusion can lead to bad will with the customer and even allegations of willful misplacement of products and/or shelf labels.

What is needed, therefore, is a method for displaying price information that is not error-prone, expensive, and/or slow. What is also needed is a system for changing pricing information that requires fewer workers and is rapidly adjustable.

SUMMARY

The present invention overcomes the problems associated with the prior art by providing a projection box with multiple projectors and display screens. The projection box can be placed on or incorporated into a retail shelving unit and display pricing and other product information relating to products placed on or near the shelf. The invention also facilitates the real time manipulation of the displayed product information via a data connection. The data connection can, for example, be directly connected to an external device or can receive image data via wired or wireless connections including, but not limited to, Ethernet, WiFi, local area network, and so on.

An example projection box includes a housing, and a first display panel and a second display panel each coupled to the housing. The projection box further includes a set of projectors disposed within the housing and operative to receive image data and to project images corresponding to the image data onto the first display panel and the second display panel. The projection box also includes an image data source and a controller. The controller is coupled to receive image data from the data source and operative to provide the image data along with control instructions to the set of projectors. In one particular embodiment, the set of projectors includes exactly one projector, which includes a projection lens group operative to transmit images from the projector onto the first display panel and the second display panel.

In another example embodiment the set of projectors includes a first projector operative to project images onto the first display panel and a second projector operative to project images onto the second display panel. In a particular embodiment, the first display panel and the second display panel are positioned on opposite sides of the housing and oriented parallel to a common plane (e.g. a vertical plane). Even more particularly, the first projector is positioned adjacent a first side wall of the housing and the second projector is positioned adjacent a second side wall of the housing, which is disposed on an opposite side of the housing from the first side wall. Additionally, the first projector includes a first projection lens group and the second projector includes a second projection lens group. Each projection lens group has an optical axis that intersects a plane defined by each respective display panel closer to an edge of each respective display panel than to the center of each respective display panel.

In an even more particular example embodiment, the first display panel lies in a first plane and the second display panel lies in a second plane. Additionally, the optical axis of the first projection lens group intersects the first plane adjacent an edge of the first display panel, and an optical axis of the second projection lens group intersects the second plane adjacent an edge of the second display panel.

In another example embodiment, the controller includes an algorithm operative to modify the image data to compress selected portions of the first image and the second image. Additionally, the first projection lens group and the second projection lens group then decompress the selected portions of the first image and the second image as the images are projected onto the first and second display panels.

In an example embodiment, the data source includes a network interface coupled to the controller. The network interface receives image data via a network connection.

Yet another example embodiment includes a light source, which includes a crossed dichroic prism, a first light emitting diode (LED), a second LED, and a third LED. The first LED is disposed to emit light of a first color into a first side of the crossed dichroic prism, the second LED is disposed to emit light of a second color into a second side of the crossed dichroic prism, and the third LED is disposed to emit light of a third color into a third side of the crossed dichroic prism. Light of the first color, light of the second color, and light of the third color exit the crossed dichroic prism from a fourth side of the crossed dichroic prism. The controller provides control signals to the light source to sequentially energize the first LED, the second LED, and the third LED, one at a time.

Another example embodiment includes a light source and an optical separator disposed to separate light from the light source into a first portion and a second portion. The optical separator also transmits the first portion of light to the first projector, and transmits the second portion of light to the second projector. In a particular embodiment, the light source includes a colored light director, a first emitter, a second emitter, and a third emitter. The first emitter is disposed to emit light of a first color into the colored light director, the second emitter is disposed to emit light of a second color into the colored light director, and the third emitter disposed to emit light of a third color into the colored light director. Additionally, the colored light director directs light of the first color, light of the second color, and light of the third color along a common optical path. The controller provides control signals to the light source such that the first emitter, the second emitter, and the third emitter are sequentially energized, one at a time. In an even more particular embodiment, the colored light director is a crossed dichroic prism and the first emitter, the second emitter, and the third emitter are light emitting diodes. In a particular example embodiment, the separator is a polarizing beam splitter, and the first portion of light and the second portion of light have a first and a second polarization orientation, respectively.

In another particular example embodiment, the separator includes a first reflector disposed to direct the first portion of light along a first optical path toward the first projector. The separator additionally includes a second reflector disposed to direct the second portion of light along a second optical path toward the second projector. In yet another particular embodiment, the light separator is disposed within the first projector. The light separator directs the first portion of the light toward an imager of the first projector and directs the second portion of the light toward the second projector.

In another embodiment the first projector includes a light source, a projection lens group, a first imager, and a first polarizing beam splitter. The first polarizing beam splitter is operative to transmit a first portion of light having a first polarization from the light source onto the imager, and also reflects modulated light from the imager into the projection lens group. The first polarizing beam splitter also reflects a second portion of light having a second polarization toward the second projector. The second projector includes a second imager, a second projection lens group, and a second polarizing beam splitter. The second polarizing beam splitter is operative to reflect the second portion of light from the first projector to the second imager and to transmit light modulated by the second imager to the second projection lens group.

In yet another example embodiment the first projector includes a light source, a projection lens group, a first imager, and a first polarizing beam splitter. The first polarizing beam splitter is operative to reflect a first portion of light having a first polarization from the light source onto the imager and to transmit modulated light from the imager into the projection lens group. The first polarizing beam splitter also transmits a second portion of light having a second polarization toward the second projector. The second projector includes a second imager, a second projection lens group, and a second polarizing beam splitter. The second polarizing beam splitter is operative to transmit the second portion of light from the first projector to the second imager and to reflect light modulated by the second imager to the second projection lens group.

A method for producing a projection system is also described. The method includes providing a housing, coupling a first display panel to the housing, and coupling a second display panel to the housing. The method further includes placing a first projector and a second projector inside the housing. The first projector is operative to receive image data and to project a first image onto the first display panel. The second projector is operative to receive image data and to project a second image onto the second display panel. The method further includes coupling an image data source to the housing and coupling a controller to the image data source, the first projector, and the second projector. The controller receives image data from the image data source and provides the image data and control signals to the first projector and the second projector.

Another example projection box includes a housing, a first display panel coupled to the housing, and a second display panel coupled to the housing. The projection box further includes an image data source and a controller. The controller is operative to receive image data from the image data source and to provide image data and control signals. The example projection box additionally includes a means for receiving control signals from the controller and projecting images corresponding to the image data onto the first display panel and the second display panel.

BRIEF DESCRIPTION OF THE DRAWINGS

The present invention is described with reference to the following drawings, wherein like reference numbers denote substantially similar elements.

DETAILED DESCRIPTION

The present invention overcomes problems associated with the prior art, by providing a projection box with multiple display panels (e.g., rear projection screens). In the following description, numerous specific details are set forth (e.g., imager types, display aspect ratios, etc.) in order to provide a thorough understanding of the invention. Those skilled in the art will recognize, however, that the invention may be practiced apart from these specific details. In other instances, details of well-known projection practices (e.g., image data driving and control routines) and components (e.g. specific lens designs, electronic and optical chassis, etc.) have been omitted, so as not to unnecessarily obscure the present invention.

Figure 1:
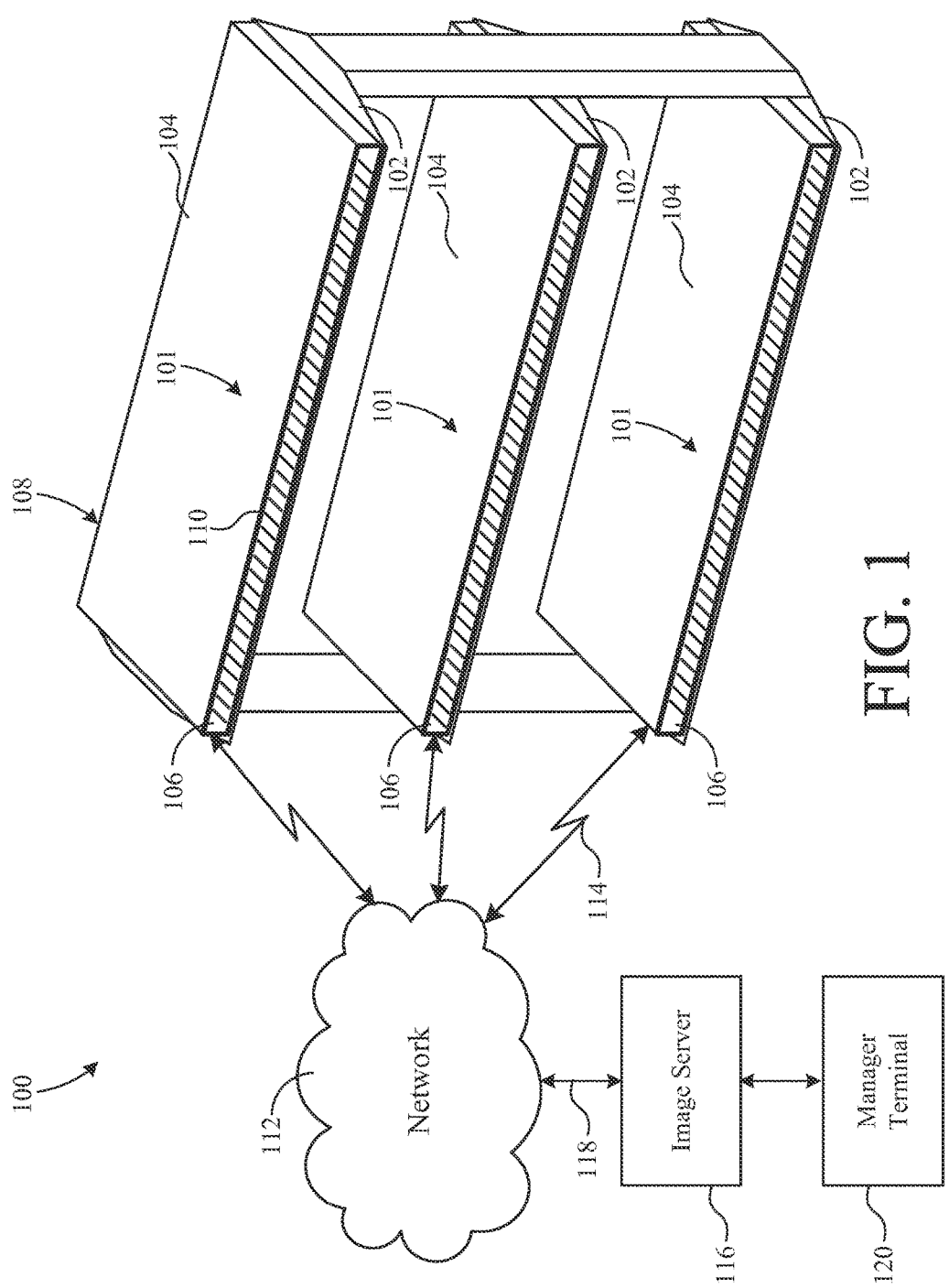
FIG. 1 is a perspective view of a projection based product information system in combination with a store shelving unit.

FIG. 1 is a perspective view of a projection based product information system 100. System 100 includes several projection boxes 101, each placed on top of a corresponding store shelf 102. Although only 3 of projection boxes 101 are shown in FIG. 1, it is expected that store-wide systems will include tens or hundreds of such projection boxes 101 on the shelves of the store. In this embodiment, projection boxes 101 are adapted to rest on shelves 102, and to support products (not shown) offered for sale thereon. Alternatively, projection boxes 101 can be suspended from the bottoms of shelves 102 or mounted on a support frame adjacent shelves 102.

Projection boxes 101 each include a housing 104, a first display panel 106, and a second display panel 108 (not visible in the view of FIG. 1). First display panel 106 is coupled to the front facing side of housing 104, and second display panel 108 (not visible) is coupled to the rear facing side of housing 104. First display panel 106 and second display panel 108 display images 110 that are communicated as image data from an image server 116, via a network 112, to projection boxes 101 via connections 114. Network 112 can include a local area network, wired or wireless, or a wide area network such as the Internet. Image server 116 can be a computer, a local network server, a tablet, or any other device suitable for storing image data and communicating the image data to projection boxes 101.

In the example embodiment, housing 104 is much shorter than it is wide. This aspect ratio facilitates placement of projection boxes 101 on and/or under store shelves 102 without wasting valuable product space. In alternate embodiments housing 104 may be much taller than it is wide, to facilitate alternate placement (e.g., vertical placement adjacent shelves 102). Additionally, first display panel 106 and second display panel 108 can be coupled to any two (or more) sides of housing 104.

In the example embodiment, first display panel 106 and second display panel 108 display images 110 to provide product information (e.g., prices, advertisements, nutritional information, etc.) to customers interested in whatever goods are displayed on shelf 102. The images can include still pictures or video.

System 100 facilitates rapid pricing updates. Prices displayed by boxes 101 can be updated by a simple data entry via a manager terminal 120. For example, if a price change for a particular item is required, a user enters the new price into image server 116 via manager terminal 120. Based on the new price, image server 116 transmits new image data (indicative of the new price), via network 112, to one of projection boxes 101 associated with the product. The image store within projection box 101 is immediately updated, and projection box 101 proceeds to display the new price for the product.

Figure 2:
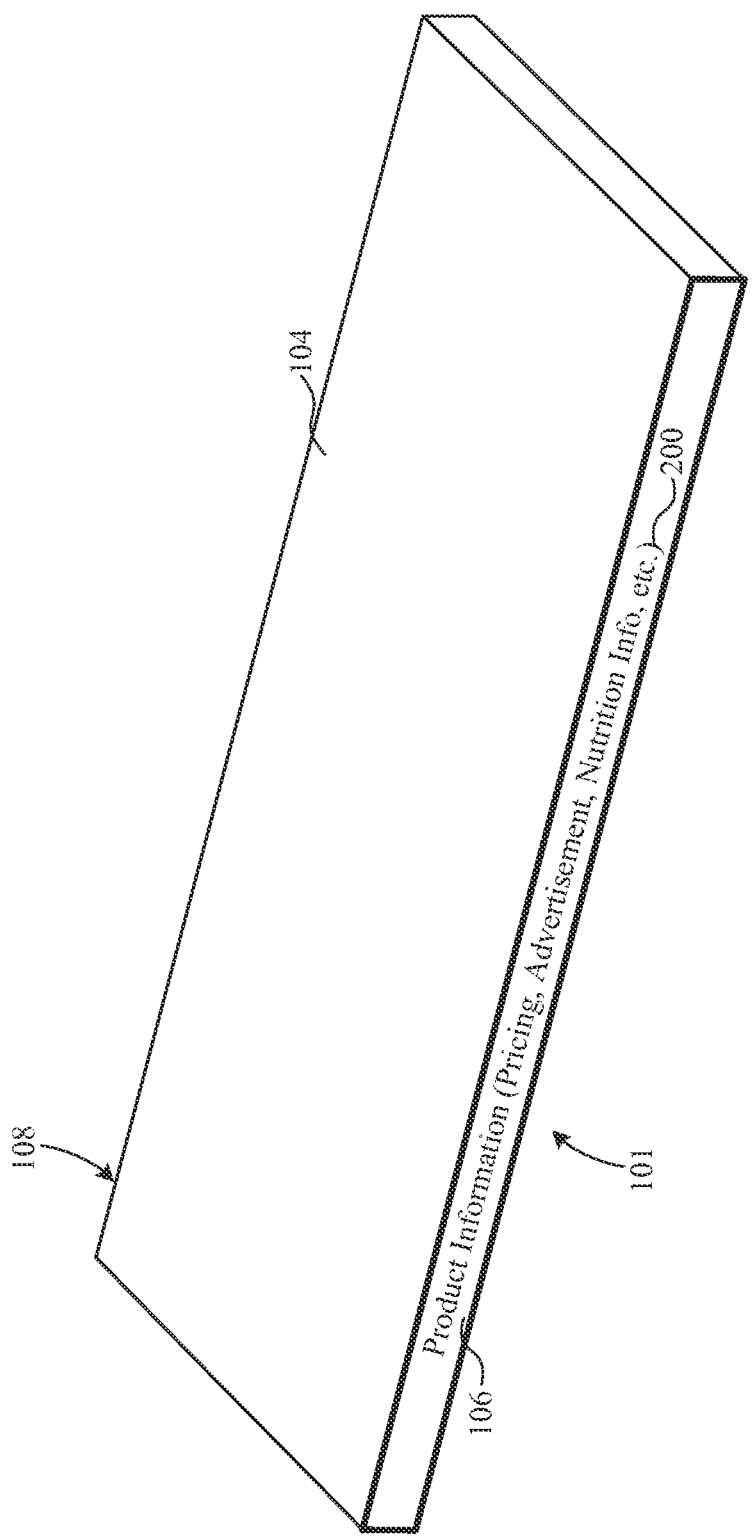
FIG. 2 is a perspective view of an individual projection box of the system of FIG. 1.

FIG. 2 shows a perspective view of an individual projection box 101. Projection box 101 includes housing 104, first display panel 106, and second display panel 108 (not visible). Product information 200 is displayed on first display panel 106 and second display panel 108. Product information 200 includes text, pictures, or video suitable to convey one or more of pricing information, advertisements, nutrition information, or any other pertinent information.

Additionally, first display panel 106 and second display panel 108 can display the same or different images. For example, if one product is placed on the front half of projection box 101, and a different product is placed on the rear half of projection box 101, then images related to the first product will be displayed on front panel 106, and different images related to the second product will be displayed on rear display 108. On the other hand, if the same product is placed on both the front and back of projection box 101, then the same image data will be displayed on display 106 and display 108.

It is also common for multiple different products to be placed next to one another on a single shelf. In that case, separate portions of display 106 (or 108) can display information related to each one of the different products.

Figure 3:
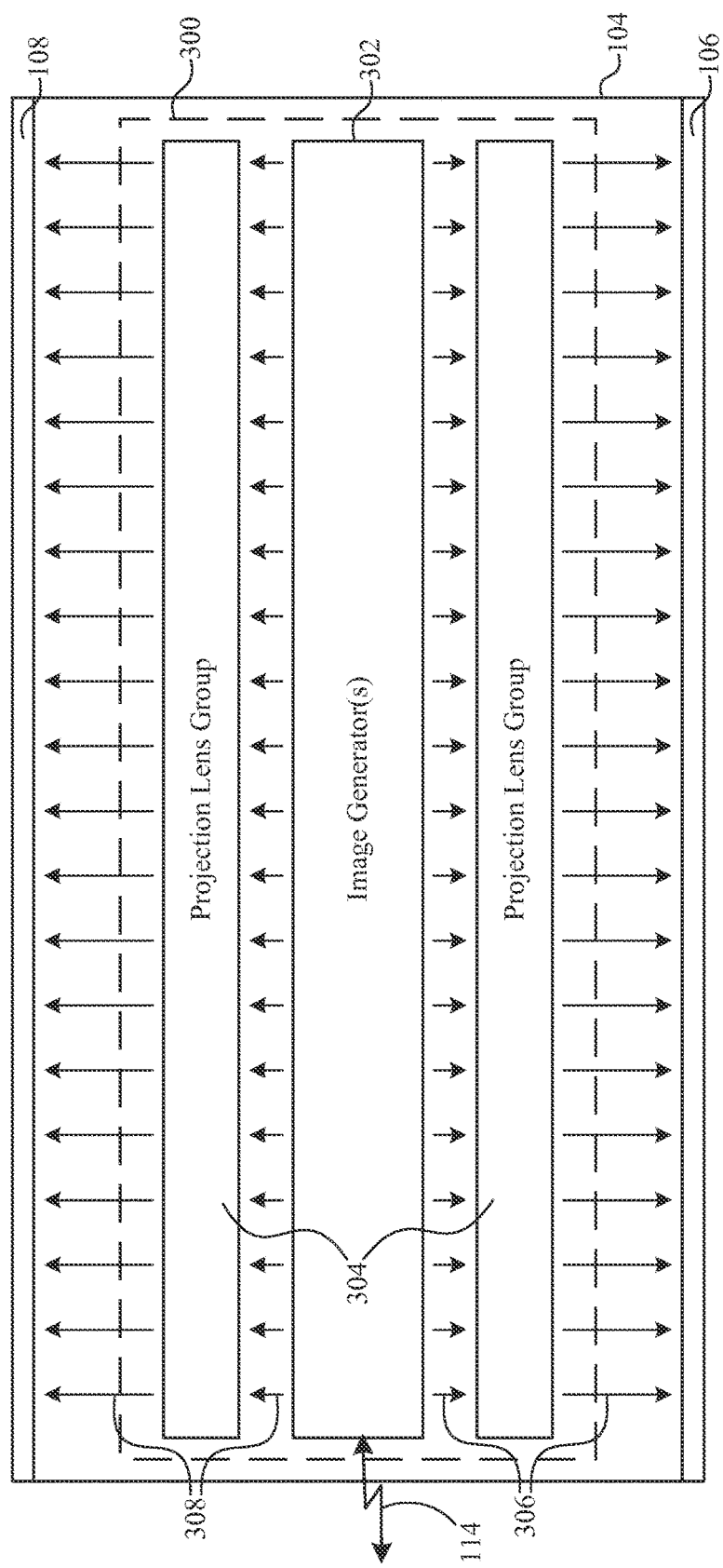
FIG. 3 is a simplified block diagram of the projection box of FIG. 2.

FIG. 3 is a simplified block diagram of projection box 101. First display panel 106 and second display panel 108 are coupled to the front facing and rear facing sides of housing 104, respectively. Housing 104 houses one or more projectors 300. Projector(s) 300 include(s) one or more image generators 302 and one or more projection lens groups 304. For example, projection box 101 can include a single projector 300 with multiple projection lens groups 304. Alternatively, projection box 101 can include multiple projectors 300, each with its own projection lens group 304. Image generator(s) 302 generate(s) imaging beams 306 and 308, based on image data received via connection 114, and directs imaging beams 306 and 308 through projection lens groups 304, which focuses imaging beams 306 and 308 onto first display panel 106 and second display panel 108, respectively.

Figure 4:
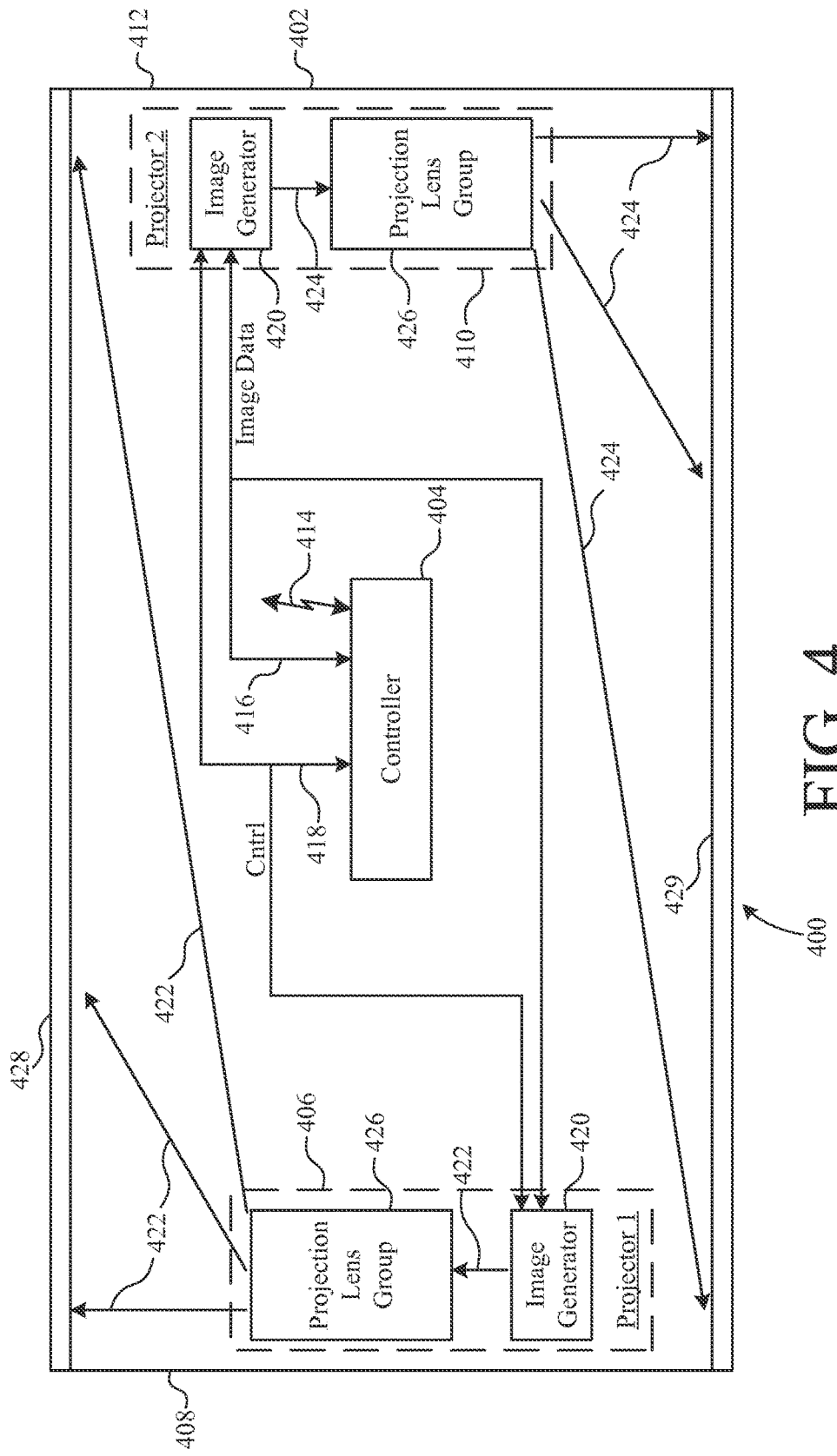
FIG. 4 is a block diagram showing the projection box of FIG. 2 in greater detail.

FIG. 4 is a block diagram of an example projection box 400, including a housing 402, which houses a controller 404, a first projector 406 positioned adjacent a first side wall 408 of housing 402, and a second projector 410, positioned adjacent an opposite sidewall 412 of housing 402. Controller 404 receives image data from an external device or network (not shown) via a connection 414 (wired or wireless). Controller 404 then provides the image data and control signals to first projector 406 and second projector 410 via an image data bus 416 and control bus ("Cntrl") 418, respectively. Responsive to the image data received via image data bus 416 and the control signals received via control bus 418, first projector 406 and second projector 410 project images on the rear surfaces of rear display panel 428 and front display panel 429.

First projector 406 and second projector 410 each include an image generator 420 and a projection lens group 426, each of which will be described in greater detail below. Each image generator 420 receives image data from controller 404 via image data bus 416 and, responsive to control signals on control bus 418, generates an imaging beam 422, 424 infused with an image corresponding to the image data. Image generator 420 of first projector 406 generates a first imaging beam 422 corresponding to images to be displayed on rear display panel 428, and image generator 420 of second projector 410 generates a second imaging beam 424 corresponding to images to be displayed on front display panel 429. First imaging beam 422 and second imaging beam 424 are directed through projection lens groups 426, which focus imaging beams 422 and 424 onto the rear surfaces of display panels 428 and 429, respectively. First imaging beam 422 and second imaging beam 424 can then be viewed on display panels 428 and 429 by viewers outside of projection box 400.

Figure 5A:
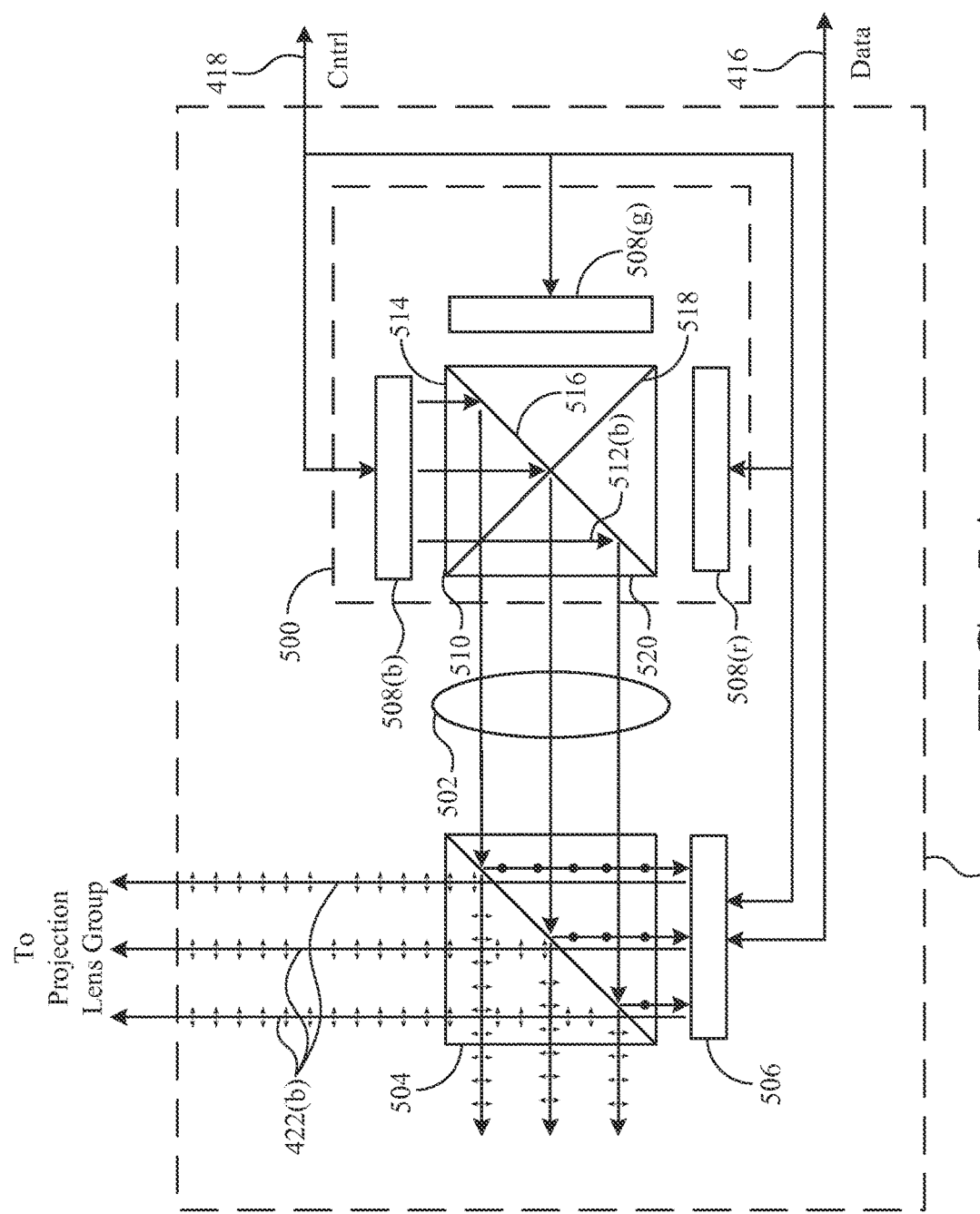
FIG. 5A is a block diagram of an image generator of the projection box of FIG. 4 with a blue light channel energized.
Figure 5B:
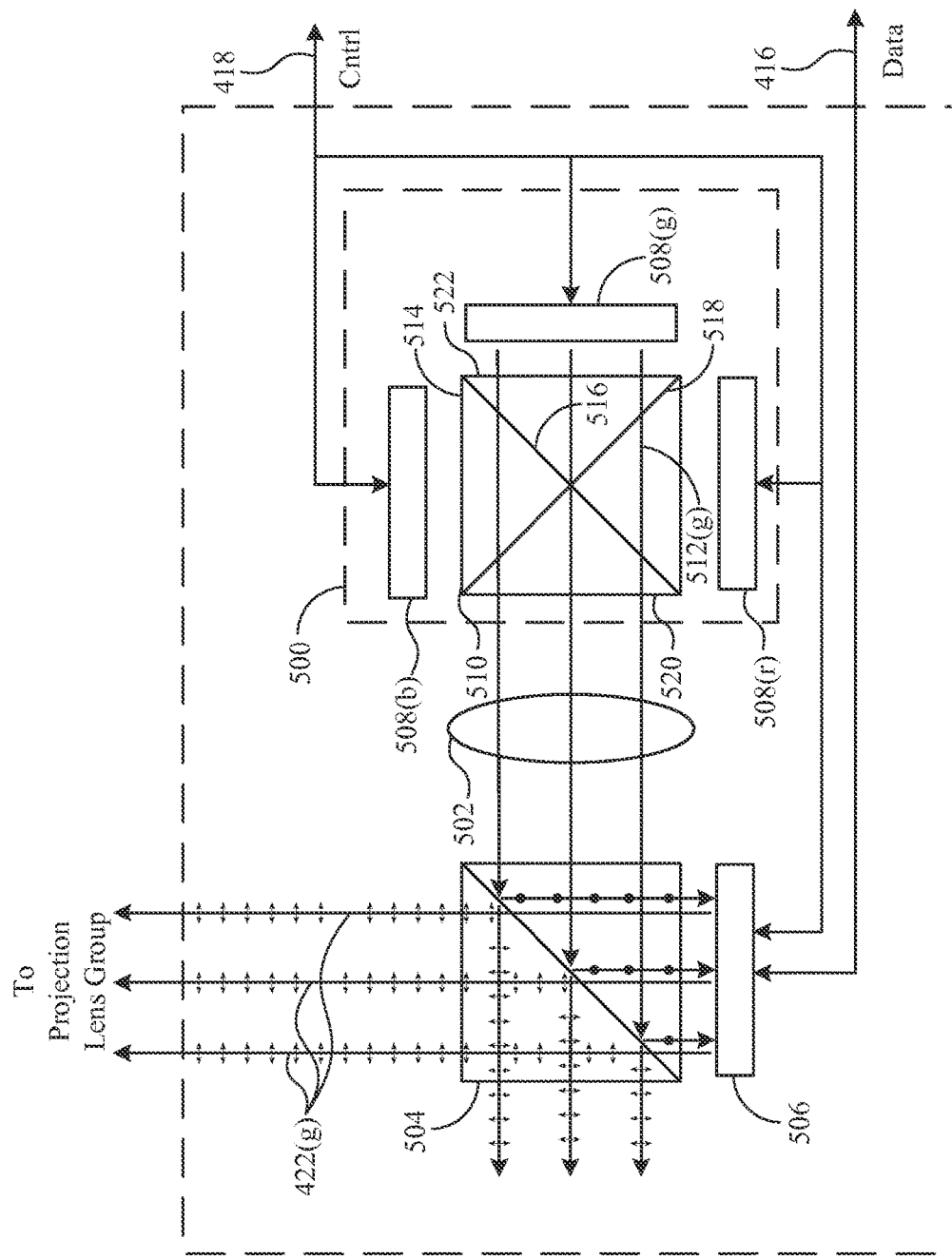
FIG. 5B is a block diagram of the image generator of the projection box of FIG. 4 with a green light channel energized.
Figure 5C:
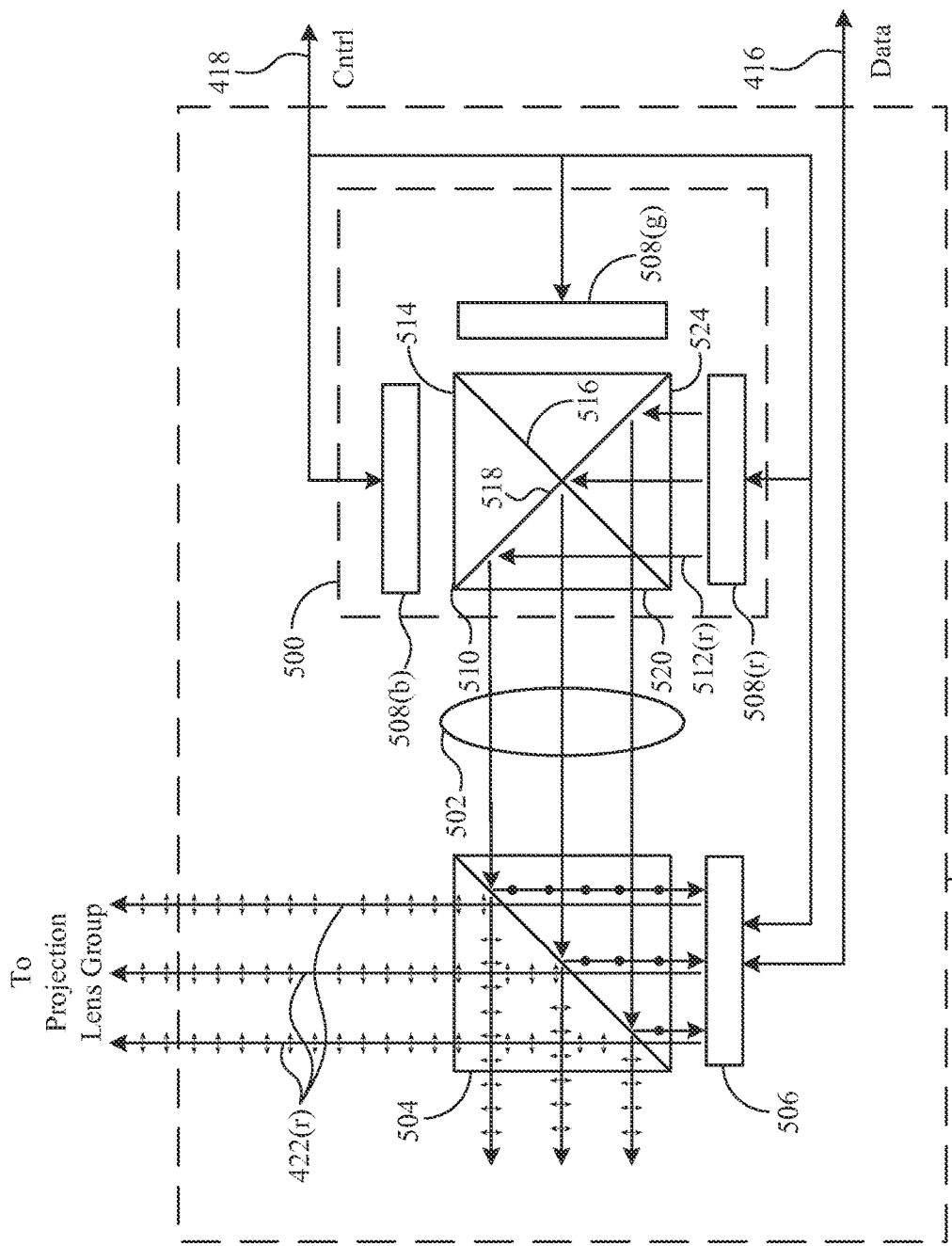
FIG. 5C is a block diagram of the image generator of the projection box of FIG. 4 with a red light channel energized.

FIGS. 5A-5C are block diagrams of an example image generator 420, including a light source 500, a collimating lens 502, a polarizing beam splitter 504, and an imager 506 (e.g., liquid crystal on silicon device). Light source 500 includes a blue light emitting diode (LED) 508*b*, a green LED 508*g*, a red LED 508*r*, and a crossed dichroic prism 510. Light source 500 illuminates imager 506 with red, green, and blue light, in a time multiplexed manner. That is, light source 500 illuminates imager 506 with only red light when imager 506 has red image data latched onto its pixels. Similarly, light source 500 illuminates imager 506 with only green light when imager 506 has green image data latched onto its pixels, and light source 500 illuminates imager 506 with only blue light when imager 506 has blue image data latched onto its pixels. The rapid series of red, green, and blue images displayed by imager 506 are integrated by the eye of the viewer, who perceives an integrated multicolored image.

FIG. 5A shows image generator 420 when only blue LED 508(*b*) is energized. Responsive to control signals received via control bus 418, blue LED 508(*b*) emits blue light 512(*b*) into a first side 514 of prism 510. Blue light 512(*b*) is transmitted through first side 514 and is reflected by a first reflective/transmissive surface 516, which reflects blue light 512(*b*) and transmits light of other colors. The reflected blue light 512(*b*) exits prism 510 from a second side 520, passes through collimating lens 502, and enters polarizing beam splitter 504. Beam splitter 504 reflects blue light 512(*b*) having a first polarization onto imager 506. Imager 506 (e.g. a liquid crystal on silicon display), based on image data received via image data bus 416 and control signals received via control bus 418, spatially modulates the incident blue light 512(*b*) and reflects the modulated light back toward beam splitter 504. Beam splitter 504 functions as an analyzer, passing portions of the modulated light as a blue imaging beam 422(*b*).

FIG. 5B shows image generator 420 when only green LED 508(*g*) is energized. Green LED 508(*g*), when energized, emits green light 512(*g*) into a third side 522 of crossed dichroic prism 510. Green light 512(*g*) is transmitted through third side 522 and, because surfaces 516 and 518 reflect only blue and red light, respectively, green light 512(*g*) passes through surfaces 516 and 518 and out of second side 520. The green light follows the optical path of the system through collimating lens 502 and into polarizing beam splitter 504. Polarizing beam splitter separates the green light based on polarization and analyzes the modulated light from imager 506 (based on green image data), as described above, to generate a green imaging beam 422(*g*).

FIG. 5C shows image generator 420 when only red LED 508(*r*) is energized. Red LED 508*r*, when energized, emits red light 512(*r*) into a fourth side 524 of crossed dichroic prism 510. Red light 512(*r*) is reflected along the optical path by reflective/transmissive surface 518, through collimating lens 502, and into polarizing beam splitter 504. The red light 512(*r*) is then separated by polarizing beam splitter 504, modulated by imager 506 (based on red image data), and analyzed by polarizing beam splitter 504 to generate a red imaging beam 422(*r*).

In the example embodiment, light source 500 includes LEDs 508 in order to sequentially provide colored light 512 to imager 506. It should be understood, however, that any suitable, multi-colored light source, now know or yet to be developed, can be substituted for light source 500. Similarly, imager 506 and polarizing beam splitter 504 can be replaced with any suitable image generator, now known or yet to be developed, including, but not limited to, transmissive liquid crystal displays.

Figure 6:
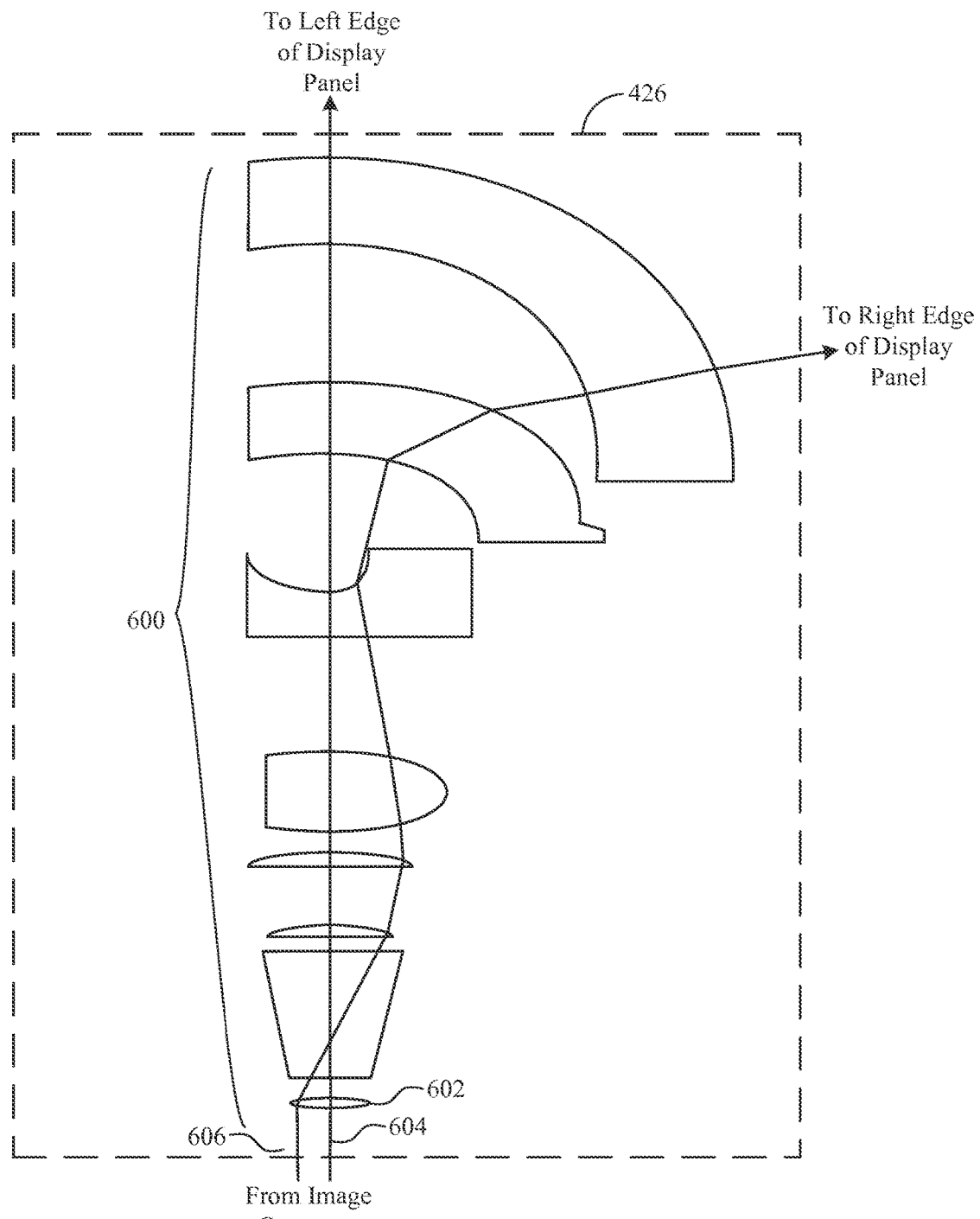
FIG. 6 is a diagram of a projection lens group of the projection box of FIG. 4.

FIG. 6 shows a diagram of projection lens group 426, including a plurality of lens components 600. Imaging beams 422 and 424 are transmitted to projection lens group 426 from image generator 420 and enter a first lens 602. Imaging beams 422 and 424 are transmitted and refracted in various ways by each lens of lens components 600. Projection lens group 426 is similar to conventional short throw projection lenses, in that it spreads imaging beams 422 and 424 outward, such that display panels 428 are completely illuminated, despite being relatively wide and relatively close to projection lens group 426.

Projection lens group 426, however, uses only about half of a conventional short throw lens and is not aligned with the central ray of imaging beam. Rather, the optical axis of projection lens group 426 is aligned with a first light ray 604, which originates from one edge of imager 506. The ray 606 originates from the opposite edge of imager 506. In other words, the optical axis of projection lens group 426 is offset with respect to the center of imager 506. As a result, only about half of a conventional short throw lens is required, resulting in a cost savings. In addition, using only half of a conventional lens saves space and allows projectors 406 and 410 to be positioned adjacent side walls 408 and 412 of housing 402.

Figure 7:
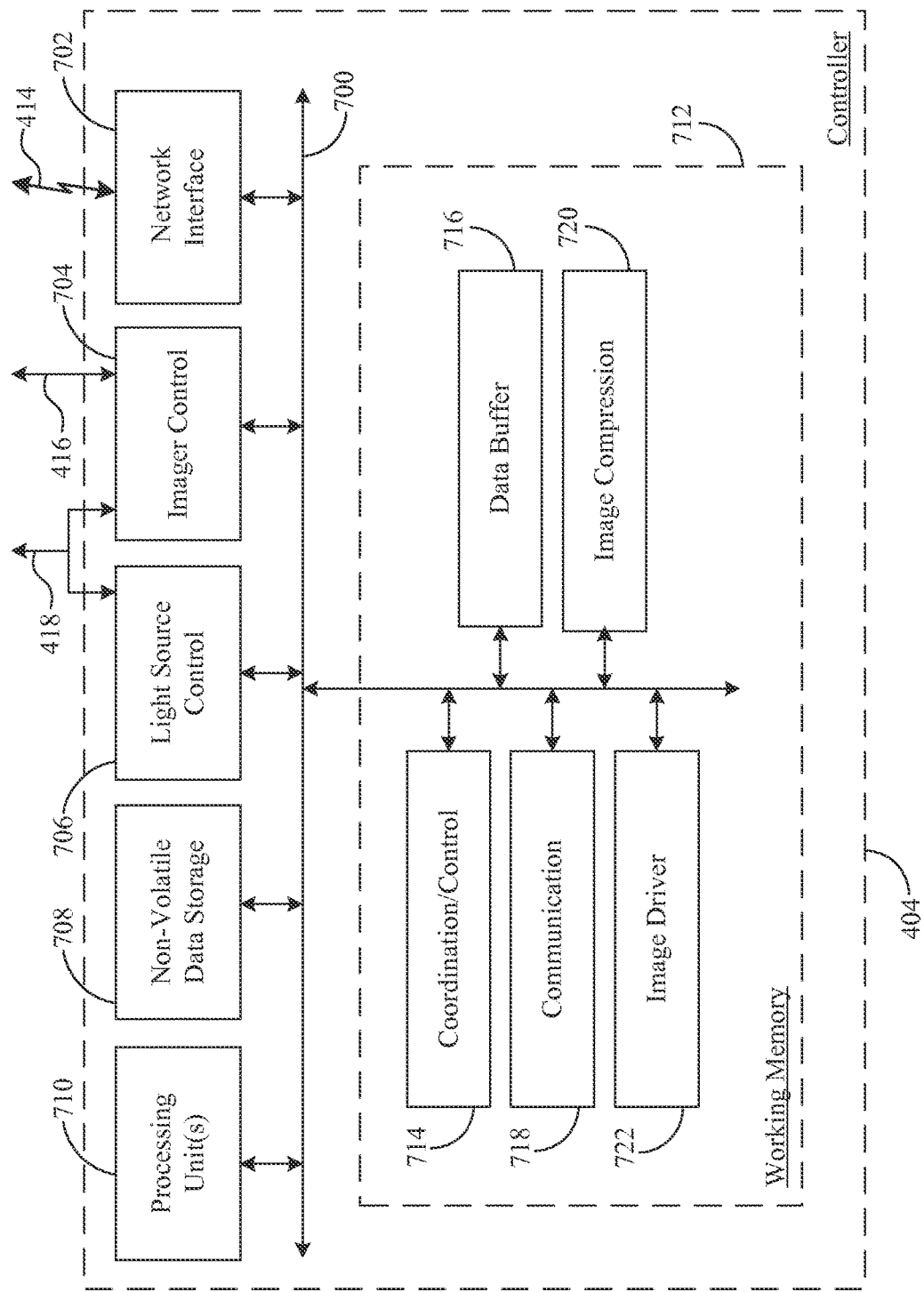
FIG. 7 is a block diagram of a controller of the projection box of FIG. 4.

FIG. 7 is a block diagram of controller 404, including a system bus 700, a network interface 702, an imager control 704, a light source control 706, non-volatile data storage 708, a processing unit 710, and a working memory 712. Components of controller 404 communicate with one another via system bus 700, which is interconnected between the components of controller 404. Network interface 702 receives image data from an external source (e.g. wired or wireless network, external device, etc.) via connection 414. Imager control 704 provides image data and control signals to imager 506 via image data bus 416 and control bus 418. Light source control 706 provides control signals to light source 500 via control bus 418. Non-volatile data storage 708 stores data and code and retains the data and code even when controller 404 is powered down. Processing unit 710 imparts functionality to controller 404 by executing code stored in non-volatile data storage 708 and/or working memory 712.

Working memory 712 provides temporary storage for data and code. Some functionality of controller 404 is represented by data and code modules shown within working memory 712. The data and code modules are transferred (in whole or in part) into and out of working memory 712 from non-volatile data storage 708 and/or network interface 702, as determined by the execution of code by processing unit(s) 710.

Working memory 712 includes a control module 714, a data buffer 716, a communication module 718, an image compression module 720, and an image driver 722. Control 714 is a higher level program that provides overall coordination and control of the other functional aspects of controller 404. Data buffer 716 temporarily stores frames of image data to be transferred to imager 506 (FIG. 5), via imager control 704 and image data bus 416. Communication module 718 facilitates communication with image server (and other external devices) via network interface 702 to receive code and image data updates. Image compression module 720 (e.g., image compression algorithms) alters the image to compress and/or stretch portions of images that might be distorted by projection lens group 426, resulting in clear, properly proportioned images on display panels 428. Such stretching and/or compression of the image data can relax tolerances of projection lens groups 426, resulting in less expensive optics. Imager driver 722 coordinates the transfer of red, green, and blue data to imager(s) 506 and the provision of control signals by light source control 706 to LEDs 508, to sequentially activate a single one of LEDs 508 when the appropriately colored image data is being asserted on imager(s) 506.

Figure 8:
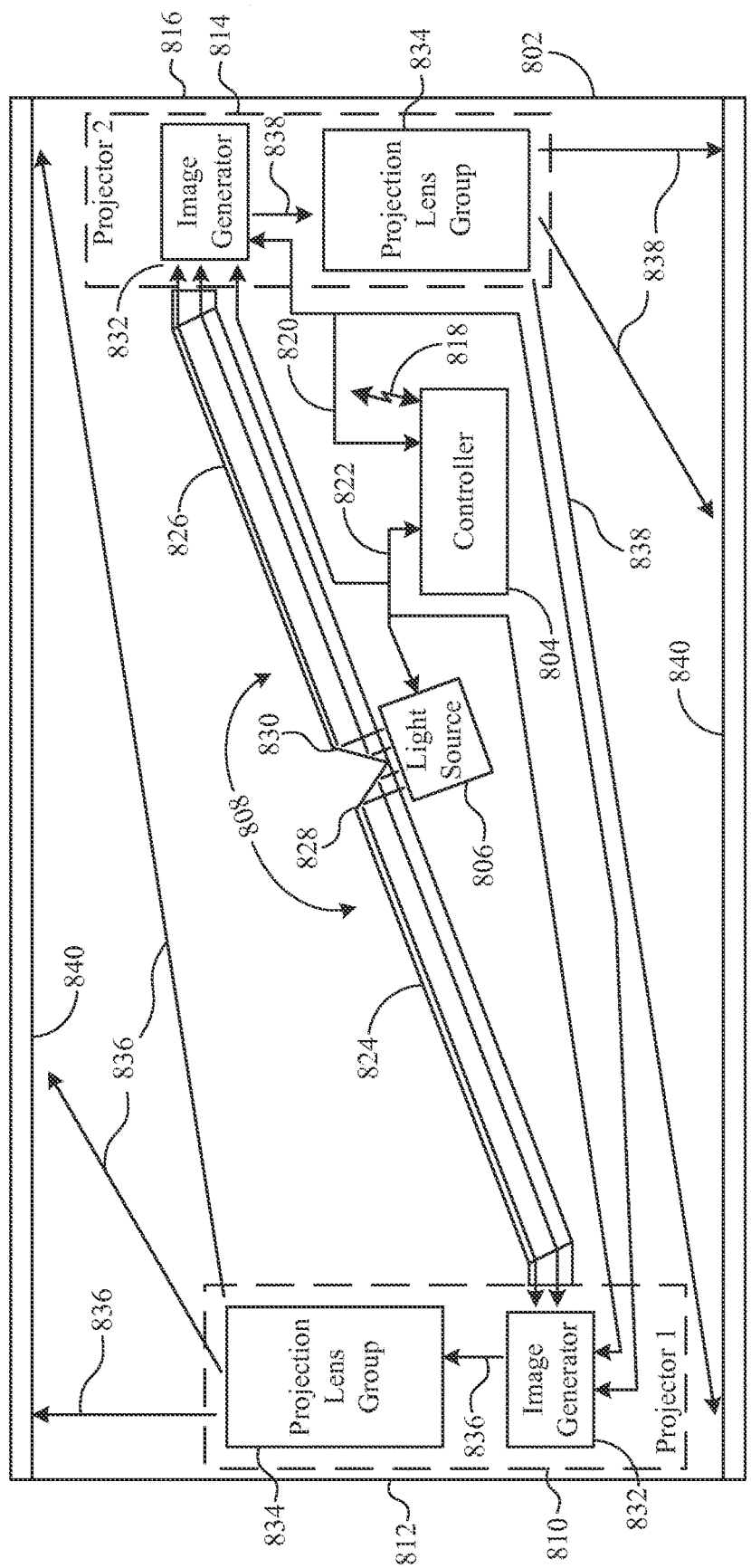
FIG. 8 is block diagram of another example projection box.

FIG. 8 is a block diagram of another example projection box 800, including a housing 802, a controller 804, a light source 806, a light pipe 808, a first projector 810 adjacent a side wall 812 of housing 802, and a second projector 814, adjacent an opposite side wall 816 of housing 802. Controller 804 receives image data from an external source (e.g. a network, external device, etc.) via a connection 818 and provides the image data and control signals to first projector 810 and second projector 814 via a data/control bus 820. Controller 804 also provides control signals to light source 806 via a control bus 822. Light source 806 is substantially similar to light source 500 (FIGS. 5A, 5B, 5C) and, based on control signals from controller 804, emits light into light pipe 808, which includes a first section 824 and a second section 826. First section 824 includes a first reflector 828 at one end, which reflects light from light source 806 into first section 824, which directs the light to first projector 810. Second section 826 includes a second reflector 830 at one end, which reflects light from light source 806 into second section 826, which directs the light to second projector 814.

Each of first projector 810 and second projector 814 include an image generator 832 and a projection lens group 834. Image generators 832 are substantially similar to image generators 420 (FIG. 4), except that image generators 832 share the same light source 806. Image generator 832 of first projector 810 receives light from the first section 824 of light pipe 808 and generates a first imaging beam 836. Image generator 832 of second projector 814 receives light from the second section 826 of light pipe 808 and generates a second imaging beam 838. Image generators 832 direct first imaging beam 836 and second imaging beam 838 through a respective one of projection lens groups 834, which focus first imaging beam 836 and second image 838 onto a respective one of display panels 840. The focused images can be viewed on display panels 840 by viewers outside of projection box 800.

Figure 9:
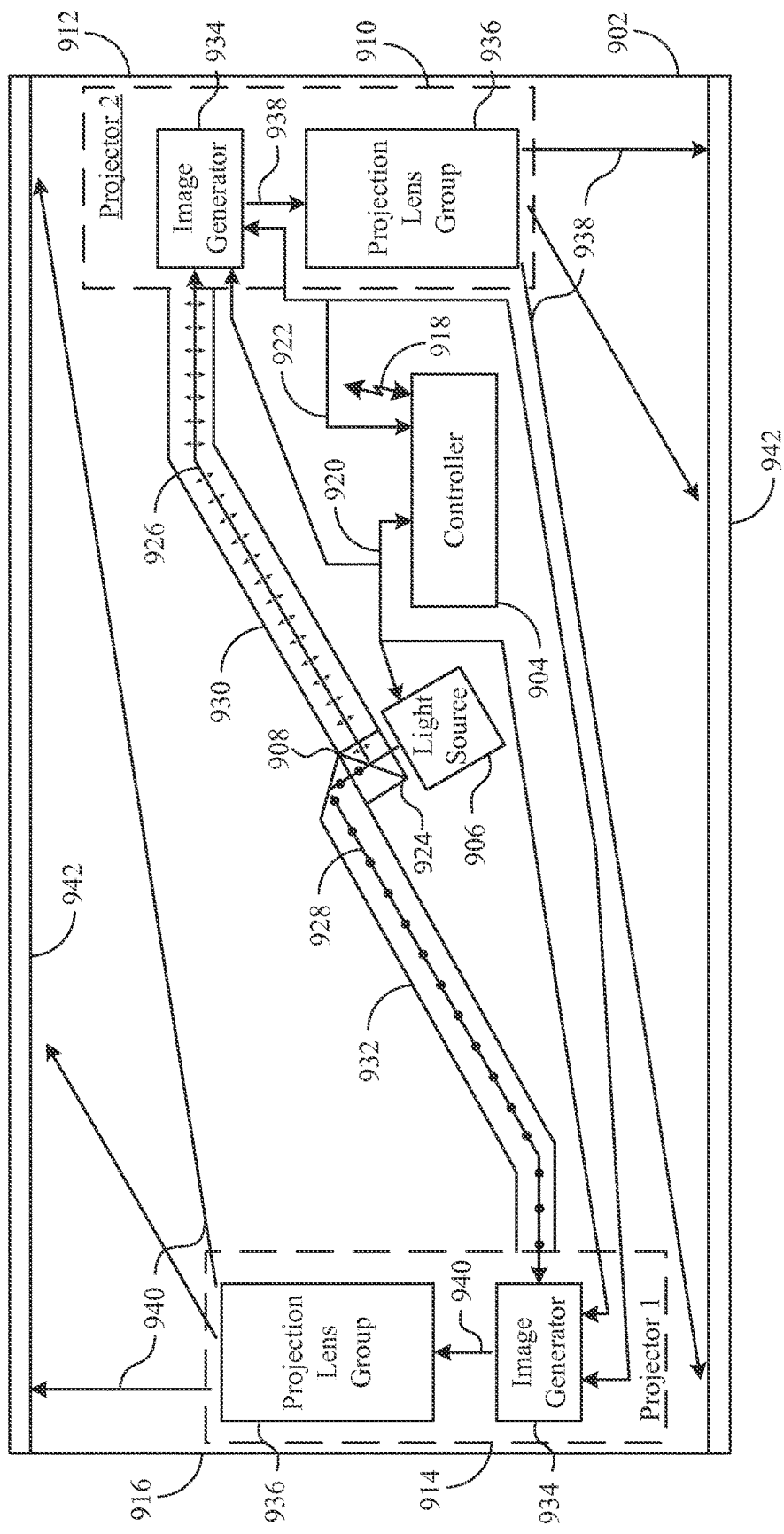
FIG. 9 is a block diagram of yet another example projection box.

FIG. 9 is a block diagram of yet another example projection box 900, including a housing 902, a controller 904, a light source 906, a light director 908, a first projector 910 adjacent a first side wall 912 of housing 902, and a second projector 914 adjacent a second side wall 916 of housing 902. Controller 904 receives image data from an external source (not shown) via connection 918 (wired or wireless), provides control signals to first projector 910 and second projector 914 via a control bus 920, and provides image data to first projector 910 and second projector 914 via an image data bus 922. Light source 906 emits light into light director 908, which directs respective portions of the light to first projector 910 and second projector 914. In this example embodiment, light director 908 includes a polarizing beam splitter 924 that is operative to divide light from light source 906 into a first portion 926 with a first polarization and a second portion 928 with a second polarization. First portion 926 is directed to first projector 910 via a first light pipe 930, and second portion 928 is directed to second projector 914 via a second light pipe 932.

First projector 910 and second projector 914 each include an image generator 934 and a projection lens group 936. Image generators 934 receive light from light pipes 930 and 932 and, based on image data and control signals from controller 904, creates a first imaging beam 938 and a second imaging beam 940. Imaging beams 938 and 940 are each focused by one of projection lens groups 936 onto an inside surface of a respective one of display panels 942, which are coupled to the forward and rear-facing sides of housing 902. Viewers can view the images on display panels 942 from the outside of projection box 900.

Projector box 900 is efficient from a light usage standpoint. In particular, substantially the entire beam emitted by light source 906 is delivered to one or the other of image generators 934. Image generators 934 are substantially similar to image generators 420, except that the polarizing beam splitters 504 (see FIGS. 5A, 5B, and 5C) included therein are configured to reflect light of the particularly polarized beam delivered by light pipes 930 and 932 onto the respective imager 506.

Figure 10:
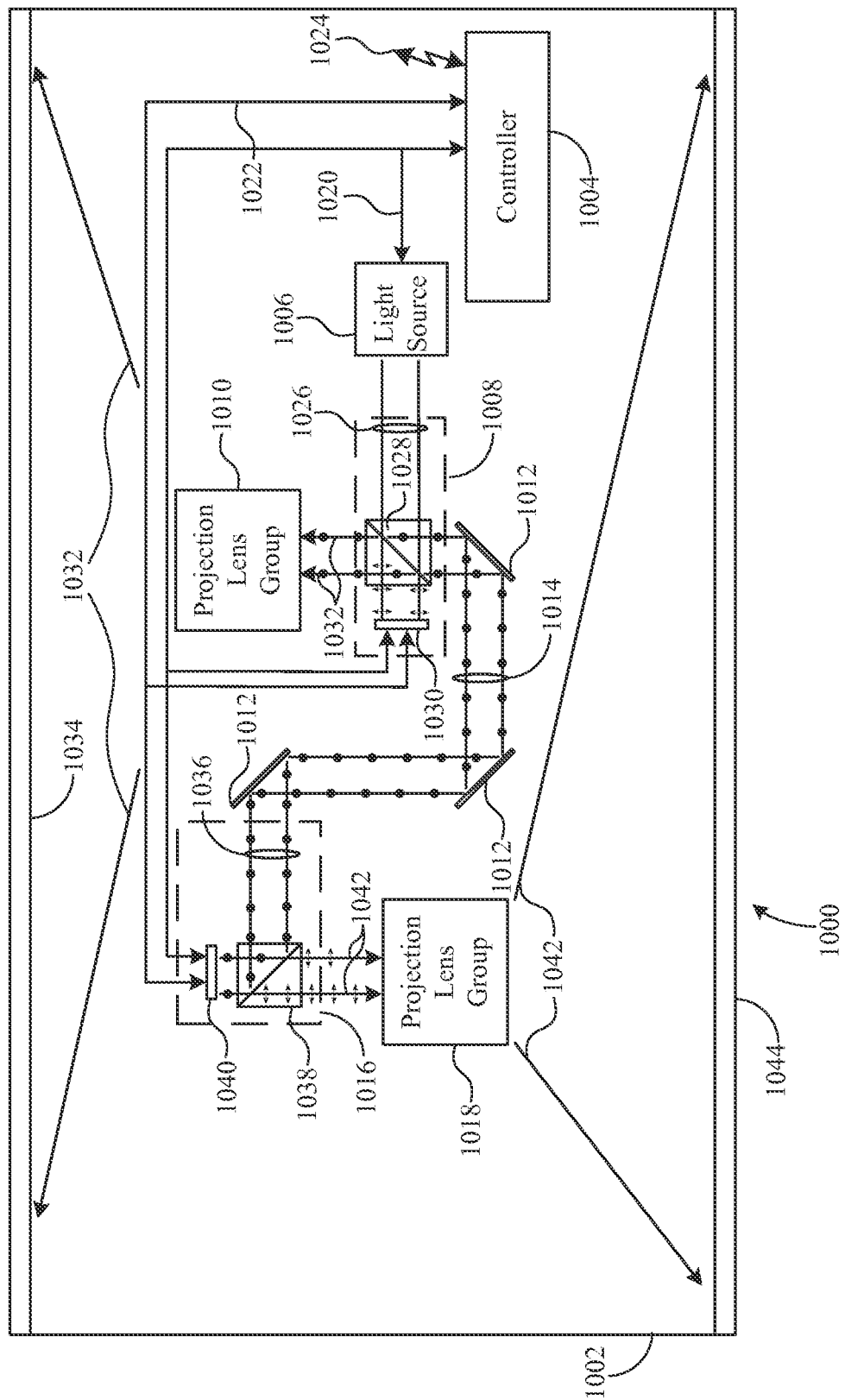
FIG. 10 is a block diagram of yet another example projection box.

FIG. 10 is a block diagram of yet another example projection box 1000, including a housing 1002, a controller 1004, a light source 1006, a first image generator 1008, a first projection lens group 1010, a plurality of mirrors 1012, a collimating lens 1014, a second image generator 1016, and a second projection lens group 1018. Controller 1004 provides control signals to light source 1006, first image generator 1008, and second image generator 1016, via a control bus 1020. Controller 1004 also provides image data to first image generator 1008 and second image generator 1016, via image data bus 1022, based on information received via a connection 1024 (wired or wireless). Light source 1006 emits light into first image generator 1008, which includes a first focusing lens 1026, a polarizing beam splitter 1028, and a first imager 1030. First focusing lens 1026 focuses and transmits light from light source 1006 onto polarizing beam splitter 1028, which splits the light into a first portion, with a first polarization, and a second portion, with a second polarization. The first portion of polarized light is transmitted by polarizing beam splitter 1028 onto first imager 1030, which modulates it, based on data control signals from controller 1004, to produce a first imaging beam 1032. First imaging beam 1032 is reflected back to polarizing beam splitter 1028, which reflects first imaging beam 1032 to first projection lens group 1010. First projection lens group 1010 focuses first imaging beam 1032 onto the rear surface of first display panel 1034, which is coupled within an opening in housing 1002.

The second portion of polarized light is reflected by polarizing beam splitter 1028 and a plurality of mirrors 1012, along an optical path through collimating lens 1014, and into second image generator 1016. Second image generator 1016 includes a second focusing lens 1036, a polarizing beam splitter 1038, and a second imager 1040. Second focusing lens 1036 focuses the second portion of light into beam splitter 1038, which reflects the light onto a modulating surface of second imager 1040. Second imager 1040 modulates the light based on image data and control signals from controller 1004, to produce a second imaging beam 1042, and reflects the second imaging beam 1042 back toward beam splitter 1038. Beam splitter 1038 transmits imaging beam 1042 through second projection lens group 1018, which focuses imaging beam 1042 onto a rear surface of a second display panel 1044. Second display panel 1044 is coupled within an opening in housing 1002, opposite first display panel 1034. Viewers can view the focused images from opposite sides of projection box 1000.

Figure 11:
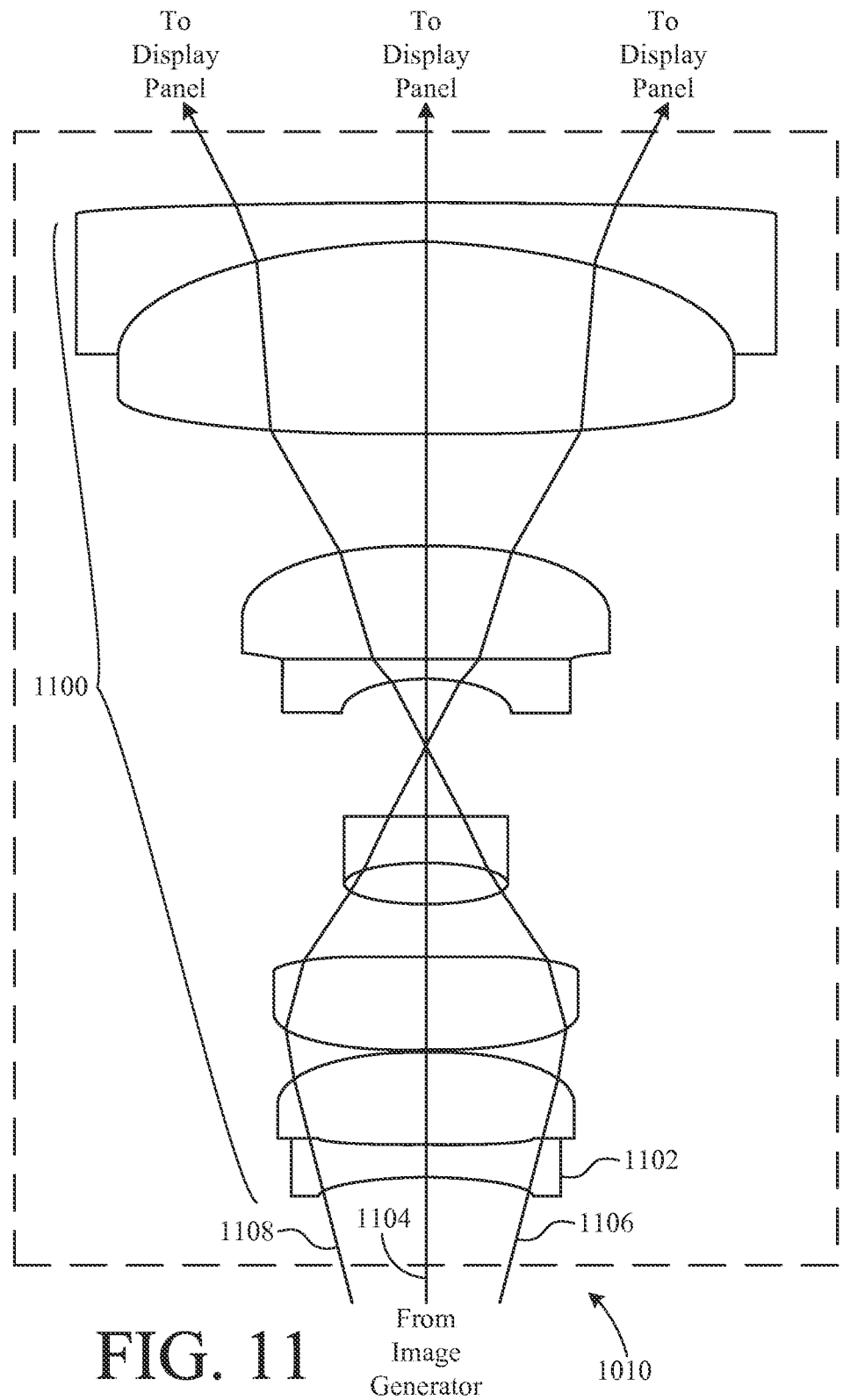
FIG. 11 is a diagram of a projection lens group of the projection box of FIG. 10.

FIG. 11 is a diagram of first projector lens group 1010 (identical to second projector lens group 1018), including a plurality of individual lens elements 1100. Projection lens group 1110 is a short throw projection lens. Because projection lens groups 1010 and 1018 are disposed nearer to the center of projection box 1000 (FIG. 10) than in previously described embodiments, substantially the entire lenses are used. Indeed, the spacing between projection lens groups 1010 and 1018 is exaggerated in FIG. 10 to clarify other elements of the drawings. In addition, unlike projection lens group 426, projection lens group 1010 is not offset relative to first imager 1030 (nor is projection lens group 1018 with respect to second imager 1040). The optical axis of projection lens group 1010, indicated by a central light ray 1104, is aligned with the center of first imager 1030. Lateral light rays 1106 and 1108 originate from the right and left side, respectively, of first imager 1030, but after being transmitted through projection lens group 1010, make up opposite sides of first imaging beam 1032 (or second imaging beam 1042). This effectively reverses an image as it appears on first imager 1030. This reversal is accounted for in the image data and results in a clear, properly proportioned image on first display panel 1034.

Many components of example projection boxes 400, 800, 900, and 1000 are identical. For example, controller 404, controller 804, controller 904, and controller 1004 are all substantial similar. Projection lens group 426, projection lens group 834, and projection lens group 936 are also similar and interchangeable. Image generator 832 and image generator 934 are also essentially identical. Any alternatives suggested for one embodiment can apply to all other embodiments that include a similar component.

The description of particular embodiments of the present invention is now complete. Many of the described features may be substituted, altered or omitted without departing from the scope of the invention. For example, alternate imagers (e.g., transmissive liquid crystal displays, digital mirror devices, etc.), may be substituted for the liquid crystal on silicon displays shown. As another example, alternate light sources may be substituted for the LEDs and crossed dichroic prisms shown. These and other deviations from the particular embodiments shown will be apparent to those skilled in the art, particularly in view of the foregoing disclosure.

We claim:

1. A projection-enabled shelving system comprising:
   a plurality of shelves arranged vertically and spaced apart from one another to facilitate the display of items between said shelves;
   a housing coupled to or resting upon at least one of said shelves;
   a first display panel coupled to said housing and facing in a first direction, such that said first display panel is outwardly visible from a first side of said at least one of said shelves;
   a second display panel coupled to said housing and facing in a second, substantially opposite direction, such that said second display panel is outwardly visible from a second, opposite side of said at least one of said shelves;
   a first projector disposed within said housing and to project a first image corresponding to image data onto said first display panel;
   a second projector disposed within said housing and operative to project a second image corresponding to said image data onto said second display panel;
   an image data source; and
   a controller coupled to receive said image data from said image data source and operative to provide said image data and control signals to said first projector and said second projector; and wherein
   said first display panel and said second display panel are positioned on opposite sides of said housing;
   said first display panel and said second display panel are oriented parallel to a common plane; and
   at least a portion of each of said first and second projectors is disposed within a volume defined by said first display panel, said second display panel, and four additional planes, each of said additional planes passing through corresponding edges of said first display panel and said second display panel.

2. The system of claim 1, wherein:
   said first projector is positioned adjacent a first side wall of said housing;
   said second projector is positioned adjacent a second side wall of said housing, said second side wall disposed on an opposite side of said housing relative to said first side wall.

3. The system of claim 2, wherein:
   said first projector includes a first projection lens group;
   said second projector includes a second projection lens group;
   an optical axis of said first projection lens group intersects a plane defined by said first display panel closer to an edge of said first display panel than to the center of said first display panel; and
   an optical axis of said second projection lens group intersects a plane defined by said second display panel closer to an edge of said second display panel than to the center of said second display panel.

4. The system of claim 2, wherein:
   said first projector includes a first projection lens group;
   said second projector includes a second projection lens group;
   said first display panel lies in a first plane;
   said second display panel lies in a second plane;
   an optical axis of said first projection lens group intersects said first plane adjacent an edge of said first display panel; and
   an optical axis of said second projection lens group intersects said second plane adjacent an edge of said second display panel.

5. The system of claim 4, wherein:
   said controller includes an algorithm operative to modify said image data to compress selected portions of said first image and said second image; and
   said first projection lens group and said second projection lens group decompress said selected portions of said first image and said second image.

6. The system of claim 1, wherein said image data source includes a network interface coupled to said controller and operative to receive said image data via a network connection.

7. The system of claim 1, further comprising a light source, said light source including:
   a crossed dichroic prism;
   a first light emitting diode (LED) disposed to emit light of a first color into a first side of said crossed dichroic prism;
   a second LED disposed to emit light of a second color into a second side of said crossed dichroic prism;
   a third LED disposed to emit light of a third color into a third side of said crossed dichroic prism; and wherein
   said light of said first color, said light of said second color, and said light of said third color exit said crossed dichroic prism from a fourth side of said crossed dichroic prism.

8. The system of claim 7, wherein said controller provides control signals to said light source to sequentially energize said first LED, said second LED, and said third LED one at a time.

9. The system of claim 1, further comprising:
   a light source; and
   an optical separator disposed to separate light from said light source into a first portion and a second portion, to transmit said first portion of light to said first projector, and to transmit said second portion of light to said second projector.

10. The system of claim 9, wherein said light source includes:
    a colored light director;

a first emitter disposed to emit light of a first color into said colored light director;

a second emitter disposed to emit light of a second color into said colored light director;

a third emitter disposed to emit light of a third color into said colored light director; and wherein said colored light director directs said light of said first color, said light of said second color, and said light of said third color along a common optical path.

11. The system of claim 10, wherein, responsive to control signals from said controller, said first emitter, said second emitter, and said third emitter are sequentially energized one at a time.

12. The system of claim 10, wherein:

said colored light director is a crossed dichroic prism; and said first emitter, said second emitter, and said third emitter are light emitting diodes.

13. The system of claim 9, wherein:

said separator is a polarizing beam splitter;

said first portion of light has a first polarization orientation; and said second portion of light has a second polarization orientation.

14. The system of claim 9, wherein said separator includes:

a first reflector disposed to direct said first portion of light along a first optical path toward said first projector; and a second reflector disposed to direct said second portion of light along a second optical path toward said second projector.

15. The system of claim 9, wherein:

said light separator is disposed within said first projector;

said light separator directs said first portion of said light toward an imager of said first projector; and said light separator directs said second portion of said light toward said second projector.

16. The system of claim 1, wherein said first projector includes:

a light source;

a projection lens group;

a first imager; and a first polarizing beam splitter operative to transmit a first portion of light having a first polarization from said light source onto said imager, reflect modulated light from said imager into said projection lens group, and reflect a second portion of light having a second polarization toward said second projector.

17. The system of claim 16, wherein said second projector includes:

a second imager;

a second projection lens group; and a second polarizing beam splitter operative to reflect said second portion of light from said first projector to said second imager and transmit light modulated by said second imager to said second projection lens group.

18. The system of claim 1, wherein said first projector includes:

a light source;

a projection lens group;

a first imager; and a first polarizing beam splitter operative to reflect a first portion of light having a first polarization from said light source onto said imager, transmit modulated light from said first imager into said projection lens group, and transmit a second portion of light having a second polarization toward said second projector.

19. The system of claim 18, wherein said second projector includes:

a second imager;

a second projection lens group; and a second polarizing beam splitter operative to transmit said second portion of light from said first projector to said second imager and reflect light modulated by said second imager to said second projection lens group.

20. A projection system comprising:

a housing;

a first display panel coupled to said housing and facing in a first direction;

a second display panel coupled to said housing and facing in a different direction than said first direction;

a first projector disposed within said housing, positioned adjacent a first side wall of said housing, and operative to project a first image onto said first display panel;

a second projector disposed within said housing, positioned adjacent a second side wall of said housing, said second side wall disposed on an opposite side of said housing relative to said first side wall, and operative to project a second image onto said second display panel;

an image data source; and a controller coupled to receive image data from said image data source and operative to provide said image data and control signals to said set of projectors; and wherein said first projector includes a first projection lens group;

said second projector includes a second projection lens group;

an optical axis of said first projection lens group intersects a plane defined by said first display panel closer to an edge of said first display panel than to the center of said first display panel; and an optical axis of said second projection lens group intersects a plane defined by said second display panel closer to an edge of said second display panel than to the center of said second display panel.

21. A projection system comprising:

a housing;

a first display panel coupled to said housing and lying in a first plane and facing in a first direction;

a second display panel coupled to said housing, lying in a second plane, and facing in a different direction than said first direction;

a first projector positioned adjacent a first side wall of said housing, including a first projection lens group, and operative to project a first image onto said first display panel;

a second projector positioned adjacent a second side wall of said housing, said second side wall disposed on an opposite side of said housing relative to said first side wall, including a second projection lens group, and operative to project a second image onto said second display panel;

an image data source; and a controller coupled to receive image data from said image data source and operative to provide said image data and control signals to said set of projectors; and wherein an optical axis of said first projection lens group intersects said first plane adjacent an edge of said first display panel; and an optical axis of said second projection lens group intersects said second plane adjacent an edge of said second display panel.

22. A projection system comprising:
a housing;
a first display panel coupled to said housing and facing in a first direction;
a second display panel coupled to said housing and facing in a different direction than said first direction;
a first projector operative to project a first image onto said first display panel;
a second projector operative to project a second image onto said second display panel;
a light source;
an optical separator disposed to separate light from said light source into a first portion and a second portion, to transmit said first portion of light to said first projector, and to transmit said second portion of light to said second projector an image data source; and
a controller coupled to receive image data from said image data source and operative to provide said image data and control signals to said set of projectors; and wherein
said optical separator is disposed within said first projector;
said optical separator directs said first portion of said light toward an imager of said first projector; and
said optical separator directs said second portion of said light toward said second projector.

23. A projection system comprising:
a housing;
a first display panel coupled to said housing and facing in a first direction;
a second display panel coupled to said housing and facing in a different direction than said first direction;
a first projector operative to project images onto said first display panel;
a second projector operative to project images onto said second display panel;
an image data source; and
a controller coupled to receive image data from said image data source and operative to provide said image data and control signals to said set of projectors; and wherein
said first projector includes
    a light source,
    a first projection lens group,
    a first imager, and
    a first polarizing beam splitter operative to
        transmit a first portion of light having a first polarization from said light source onto said imager,
        reflect modulated light from said imager into said first projection lens group, and
        reflect a second portion of light having a second polarization toward said second projector.

24. A projection system comprising:
a housing;
a first display panel coupled to said housing and facing in a first direction;
a second display panel coupled to said housing and facing in a different direction than said first direction;
a first projector operative to project images onto said first display panel;
a second projector operative to project images onto said second display panel;
an image data source; and
a controller coupled to receive image data from said image data source and operative to provide said image data and control signals to said set of projectors; and wherein
said first projector includes
    a light source,
    a first projection lens group,
    a first imager, and
    a first polarizing beam splitter operative to
        reflect a first portion of light having a first polarization from said light source onto said imager,
        transmit modulated light from said imager into said first projection lens group, and
        transmit a second portion of light having a second polarization toward said second projector.

* * * * *